(12) United States Patent
Pisek et al.

(10) Patent No.: US 7,930,623 B2
(45) Date of Patent: Apr. 19, 2011

(54) METHOD AND SYSTEM FOR GENERATING PARALLEL CODES

(75) Inventors: Eran Pisek, Plano, TX (US); Yan Wang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1258 days.

(21) Appl. No.: 11/517,985

(22) Filed: Sep. 8, 2006

(65) Prior Publication Data

US 2007/0226601 A1    Sep. 27, 2007

Related U.S. Application Data

(60) Provisional application No. 60/780,034, filed on Mar. 7, 2006, provisional application No. 60/795,716, filed on Apr. 28, 2006.

(51) Int. Cl.
*G06F 11/10* (2006.01)

(52) U.S. Cl. .......................................................... 714/824
(58) Field of Classification Search .................. 714/746, 714/824; 380/268, 252
See application file for complete search history.

(56) References Cited

U.S. PATENT DOCUMENTS

| | | | |
|---|---|---|---|
| 6,389,138 B1 * | 5/2002 | Li et al. | 380/35 |
| 7,308,104 B1 * | 12/2007 | Kim et al. | 380/268 |
| 7,346,165 B2 * | 3/2008 | Seo et al. | 380/252 |
| 7,436,963 B2 * | 10/2008 | Lo Iacono et al. | 380/268 |
| 7,489,722 B2 * | 2/2009 | Denk | 375/146 |

* cited by examiner

*Primary Examiner* — Shelly A Chase

(57) ABSTRACT

A method for generating parallel codes is provided that includes generating a plurality of pairs of outputs for each clock cycle using a single code generator and generating a code based on each pair of outputs using the single code generator.

24 Claims, 12 Drawing Sheets

METHOD AND SYSTEM FOR GENERATING PARALLEL CODES

CROSS-REFERENCE TO RELATED APPLICATIONS AND CLAIM OF PRIORITY

The present application is related to U.S. Provisional Patent No. 60/780,034, filed Mar. 7, 2006, titled "Parallel Code Generator" and U.S. Provisional Patent No. 60/795,716, filed Apr. 28, 2006, titled "Method and Apparatus for Multi-Code Correlation". Provisional Patent Nos. 60/780,034 and 60/795,716 are assigned to the assignee of this application and are hereby incorporated by reference as if fully set forth herein. This application hereby claims priority under 35 U.S.C. §119(e) to U.S. Provisional Patent Nos. 60/780,034 and 60/795,716.

The present application is also related to U.S. patent application Ser. No. 11/501,577, filed Aug. 9, 2006, titled "Multi-Code Correlation Architecture for Use in Software-Defined Radio Systems." U.S. patent application Ser. No. 11/501,577 is assigned to the assignee of the present application and is incorporated by reference into the present application as if fully set forth herein.

TECHNICAL FIELD OF THE INVENTION

The present invention relates generally to wireless communication networks and, more specifically, to a method and system for generating parallel codes.

BACKGROUND OF THE INVENTION

In current wireless communication networks, software-defined radio (SDR) devices may be implemented. SDR devices use reconfigurable hardware that may be programmed over the air to operate under different wireless protocols. For example, an SDR transceiver in a wireless laptop computer may be configured by a first software load to operate in a CDMA2000 wireless network and may be reconfigured by a second software load to operate in an HSDPA wireless network. SDR systems minimize cost (design time, TTM) and power consumption, while maximizing flexibility, thereby providing an optimized combination of scalability and modularity.

One such approach involves a re-configurable correlation unit that may be implemented in a context-based operation reconfigurable instruction set processor, as disclosed in U.S. patent application Ser. No. 11/501,577, incorporated by reference above. Such a correlation unit matches the architecture to the domain of application and optimizes the performance and power jointly. Thus, the real-time processing requirements and low-power requirements of wireless mobile stations are met simultaneously. The correlation unit is highly re-configurable and may be used for different functional blocks operating under different standards.

In these correlation units and other types of systems, including WCDMA and/or other pseudo-noise generating systems, scrambling code is widely used. In a WCDMA system, for example, the scrambling code sequences are constructed by combining two real sequences into a complex sequence. Each of the two real sequences is constructed as position wise modulo 2 sum of 38400 chip segments of two binary m-sequences. At the receiver side, the same scrambling code is generated and used to descramble the received signal.

Because the descrambling rate is high for a conventional WCDMA system, scrambling codes have to be processed at a high rate that forces the scrambling code generator either to run faster or to use parallel execution to make the descrambling processing faster. For example, for 4× parallelism, conventional systems provide for allowing the scrambling code generator to run four times faster, which increases the power consumption, or provide for duplication of the scrambling code generator four times, resulting in the consumption of at least four times more area. Other solutions use memory to store pre-calculated scrambling codes, which increases the memory usage and results in higher power consumption and increased die area. Furthermore, this solution makes support for changes in the scrambling code, such as during handover, difficult. Therefore, there is a need in the art for an improved method for generating codes.

SUMMARY OF THE INVENTION

A method for generating parallel codes is provided. According to an advantageous embodiment of the present disclosure, the method includes generating a plurality of pairs of outputs for each clock cycle using a single code generator and generating a code based on each pair of outputs using the single code generator.

According to another embodiment of the present disclosure, a system for generating parallel codes is provided that includes a feedforward block, a shift register, and a feedback block. The feedforward block is operable to generate a plurality of first outputs with each clock cycle. The shift register is coupled to the feedforward block and is operable to store a plurality of bits and to generate a corresponding second output for each first output with each clock cycle. Each first output and corresponding second output comprise a pair of outputs. The feedback block is coupled to the shift register and is operable to generate a feedback output for the shift register. The system is operable to generate parallel codes, each of which is generated based on one of the pairs of outputs.

According to yet another embodiment of the present disclosure, a correlation unit capable of processing data using parallel codes is provided that includes a single code generator, a plurality of add-subtract cells, and at least one processing unit. The single code generator is operable to generate parallel codes. The add-subtract cells are each operable to receive a plurality of cell inputs and to generate a plurality of cell outputs based on the cell inputs. The processing unit is coupled to the code generator and to the add-subtract cells and is operable to process the cell outputs and the parallel codes to generate a plurality of accumulated results.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or" is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 12, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged processing system.

Figure 1:
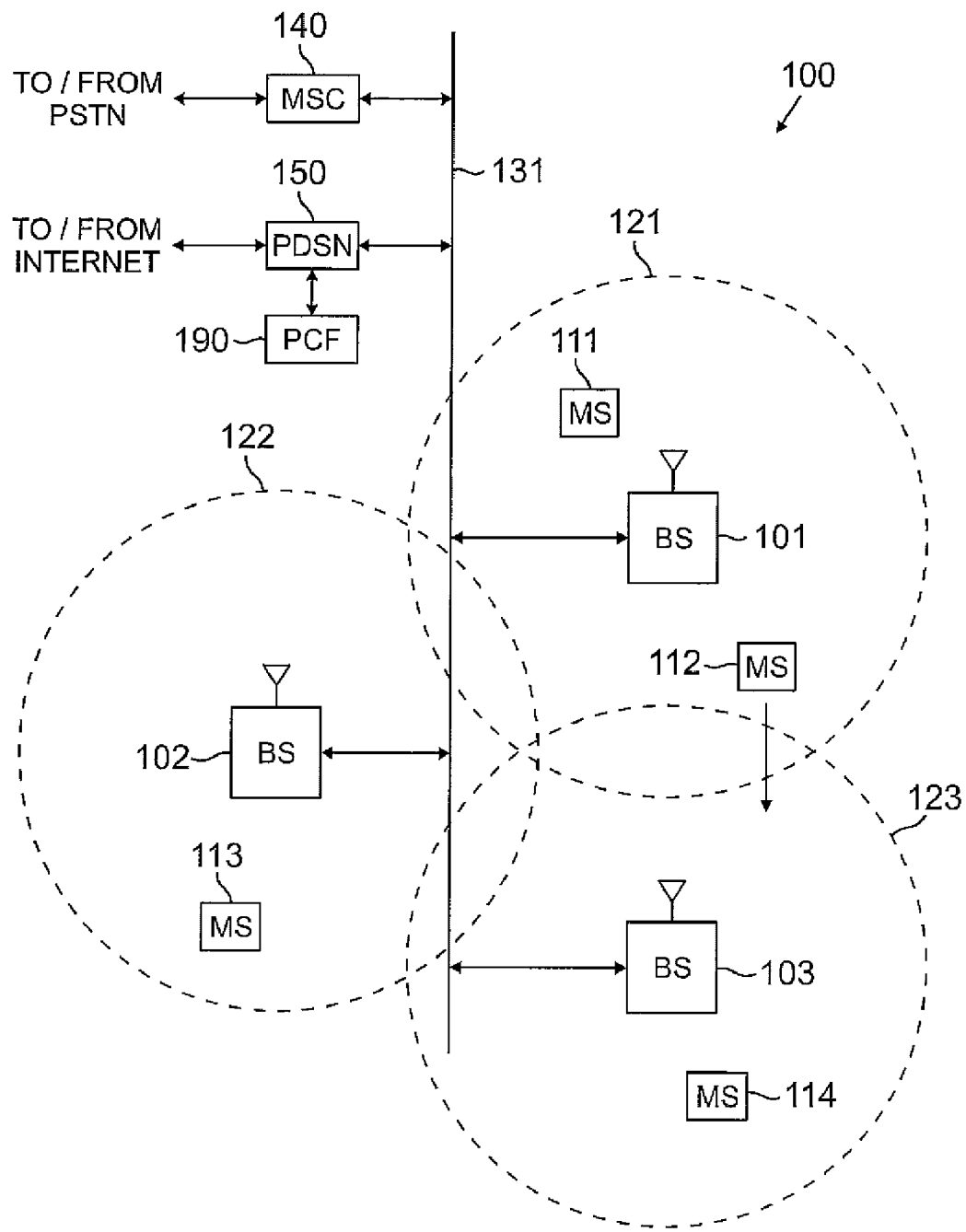
FIG. 1 illustrates a wireless network including base stations and mobile stations capable of generating parallel codes according to one embodiment of the disclosure.

FIG. 1 illustrates a wireless network 100 capable of generating parallel codes, such as scrambling codes, according to one embodiment of the disclosure. Wireless network 100 comprises a plurality of cells (or cell sites) 121-123, each containing one of the base stations, BS 101, BS 102, or BS 103. Base stations 101-103 communicate with a plurality of mobile stations (MS) 111-114 over code division multiple access (CDMA) channels according to, for example, the IS-2000 standard (i.e., CDMA2000). In an advantageous embodiment of the present disclosure, mobile stations 111-114 are capable of receiving data traffic and/or voice traffic on two or more CDMA channels simultaneously. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

The present disclosure is not limited to mobile devices. The present disclosure also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

Dotted lines show the approximate boundaries of cells (or cell sites) 121-123 in which base stations 101-103 are located. It is noted that the terms "cells" and "cell sites" may be used interchangeably in common practice. For simplicity, the term "cell" will be used hereafter. The cells are shown approximately circular for the purposes of illustration and explanation only. It should be clearly understood that the cells may have other irregular shapes, depending on the cell configuration selected and variations in the radio environment associated with natural and man-made obstructions.

As is well known in the art, each of cells 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present disclosure is not limited to any particular cell configuration.

In one embodiment of the present disclosure, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell. This equipment may include air conditioning units, heating units, electrical supplies, telephone line interfaces and RF transmitters and RF receivers. For the purpose of simplicity and clarity in explaining the operation of the present disclosure, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

In accordance with the present disclosure, one or more of base stations 101-103 and one or more of mobile stations 111-114 are operable to generate parallel codes, such as scrambling codes for use in distinguishing between cells 121-123. As used herein, "parallel codes" means a plurality of codes generated in parallel with each other. As described in more detail below in connection with FIGS. 2 and 9-12, these base stations 101-103 and mobile stations 111-114 are operable to generate the parallel codes using a single code generator. As used herein, a "single code generator" means a code generator implemented without the use of duplicate code generators. Thus, a code generator that employs duplicate code generators for generating multiple codes at the same time is not a single code generator for purposes of this disclosure, even though it may be implemented as a single component.

To generate the parallel codes using a single code generator, the base stations 101-103 and the mobile stations 111-114 are operable to generate during each clock cycle a specified multiple of a standard number of outputs, with the standard number of outputs being the number of outputs typically used in generating a single code. The number of parallel codes generated is based on the specified multiple. For example, if four times as many outputs are generated during each clock cycle, four parallel codes may be generated.

Communication line 131 may be any suitable connection means, including a T1 line, a T3 line, a fiber optic link, a network packet data backbone connection, or any other type of data connection. Alternatively, communication line 131 may be replaced by a wireless backhaul system, such as microwave transceivers. Communication line 131 links each vocoder in the BSC with switch elements in MSC 140. The connections on communication line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the mobile stations in a wireless network and external networks, such as the PSTN or Internet. MSC 140 is well known to those skilled in the art. In some embodiments, communication line 131 may be several different data links where each data link couples one of BS 101, BS 102, or BS 103 to MSC 140.

In exemplary wireless network 100, MS 111 is located in cell 121 and is in communication with BS 101. MS 112 is also located in cell 121 and is in communication with BS 101. MS 113 is located in cell 122 and is in communication with BS 102. MS 114 is located in cell 123 and is in communication with BS 103. MS 112 is also located close to the edge of cell 123 and is moving in the direction of cell site 123, as indicated by the direction arrow proximate MS 112. At some point, as MS 112 moves into cell site 123 and out of cell site 121, a hand-off will occur.

Figure 2A:
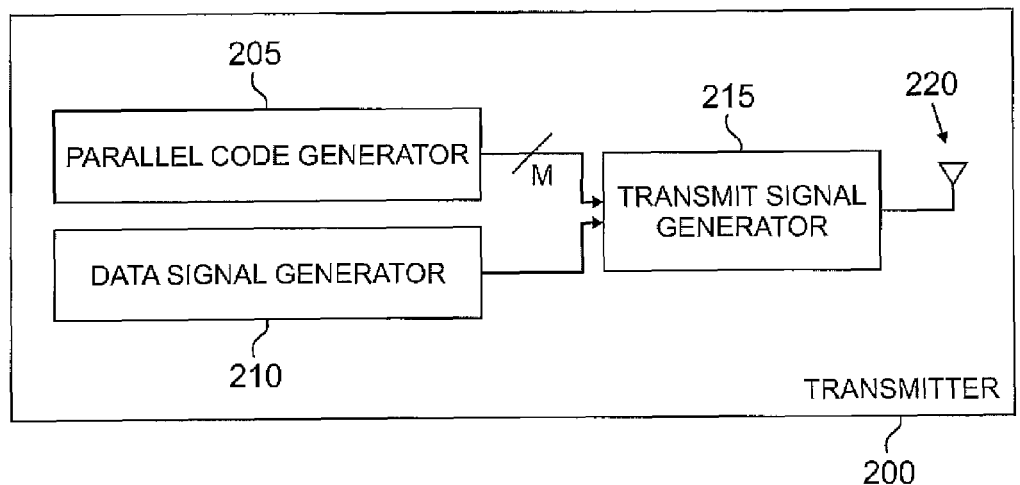
FIG. 2A is a block diagram of a transmitter capable of generating parallel codes in the wireless network of FIG. 1 according to one embodiment of the disclosure.

FIG. 2A is a block diagram of a transmitter 200 capable of generating parallel codes, such as scrambling codes, in wireless network 100 according to one embodiment of the disclosure. For one embodiment, transmitter 200 may comprise a transmitter implemented in a base station 101-103 or a mobile station 111-114 of wireless network 100.

For the illustrated embodiment, transmitter 200 comprises parallel code generator 205, data signal generator 210, transmit signal generator 215 and antenna 220. It will be understood that transmitter 200 may comprise any other suitable components not illustrated in FIG. 2A without departing from the scope of this disclosure.

Parallel code generator 205 may comprise a linear feedback shift register (LFSR)-based code generator, such as a scrambling code generator, or any suitable type of pseudo-noise generator. Parallel code generator 205 is operable to generate M parallel codes, as described in more detail below in connection with FIGS. 9-12, and to provide the M codes to transmit signal generator 215 in parallel. The number of parallel codes, M, may comprise any suitable number.

Figure 2B:
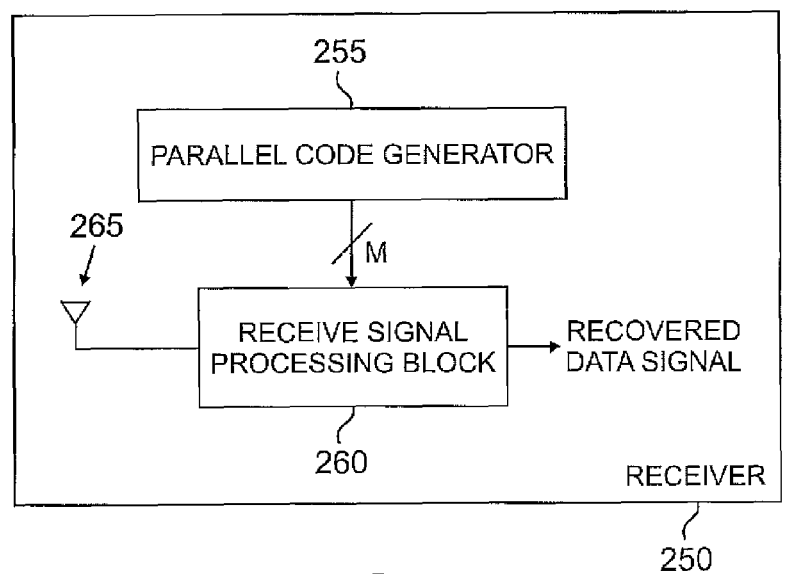
FIG. 2B is a block diagram of a receiver capable of generating parallel codes in the wireless network of FIG. 1 according to one embodiment of the disclosure.

Data signal generator 210 represents any number of components capable of generating data signals for transmission from transmitter 200 to a receiver, such as receiver 250 of FIG. 2B. Transmit signal generator 215 is coupled to parallel code generator 205 and data signal generator 210 and is operable to receive the parallel codes from parallel code generator 205 and the data signals from data signal generator 210.

Transmit signal generator 215 is then operable to generate transmit signals for transmission over antenna 220 based on the parallel codes and the data signals. For example, transmit signal generator 215 may be operable to scramble a data signal based on parallel scrambling codes before transmitting the resulting transmit signal over antenna 220. It will be understood that transmit signal generator 215 may also be operable to perform other suitable processing, such as by XORing the parallel codes by Walsh codes to generate different keys for each channel in a cell.

FIG. 2B is a block diagram of a receiver 250 capable of generating parallel codes, such as scrambling codes, in wireless network 100 according to one embodiment of the disclosure. For one embodiment, receiver 250 may comprise a receiver implemented in a base station 101-103 or a mobile station 111-114 of wireless network 100.

For the illustrated embodiment, receiver 250 comprises parallel code generator 255, receive signal processing block 260 and antenna 265. It will be understood that receiver 250 may comprise any other suitable components not illustrated in FIG. 2B without departing from the scope of this disclosure.

Parallel code generator 255 may comprise an LFSR-based code generator, such as a scrambling code generator, or any suitable type of pseudo-noise generator. Parallel code generator 255 corresponds to parallel code generator 205 such that a signal coded based on the parallel codes generated by parallel code generator 205 may be decoded based on the same parallel codes generated by parallel code generator 255. Parallel code generator 255 is operable to generate M parallel codes, as described in more detail below in connection with FIGS. 9-12, and to provide the M codes to receive signal processing block 260 in parallel.

Receive signal processing block 260 represents any number of components capable of processing signals received from a transmitter, such as transmitter 200, over antenna 265. Receive signal processing block 260 is coupled to parallel code generator 255 and is operable to receive the parallel codes from parallel code generator 255 and the received signals from antenna 265.

Receive signal processing block 260 is then operable to process the received signals, at least in part based on the parallel codes. For example, receive signal processing block 260 may be operable to descramble a received signal based on parallel scrambling codes in order to generate a recovered data signal that corresponds to a data signal scrambled with corresponding parallel scrambling codes in the transmitter that transmitted the signal, such as transmitter 200.

Figure 3:
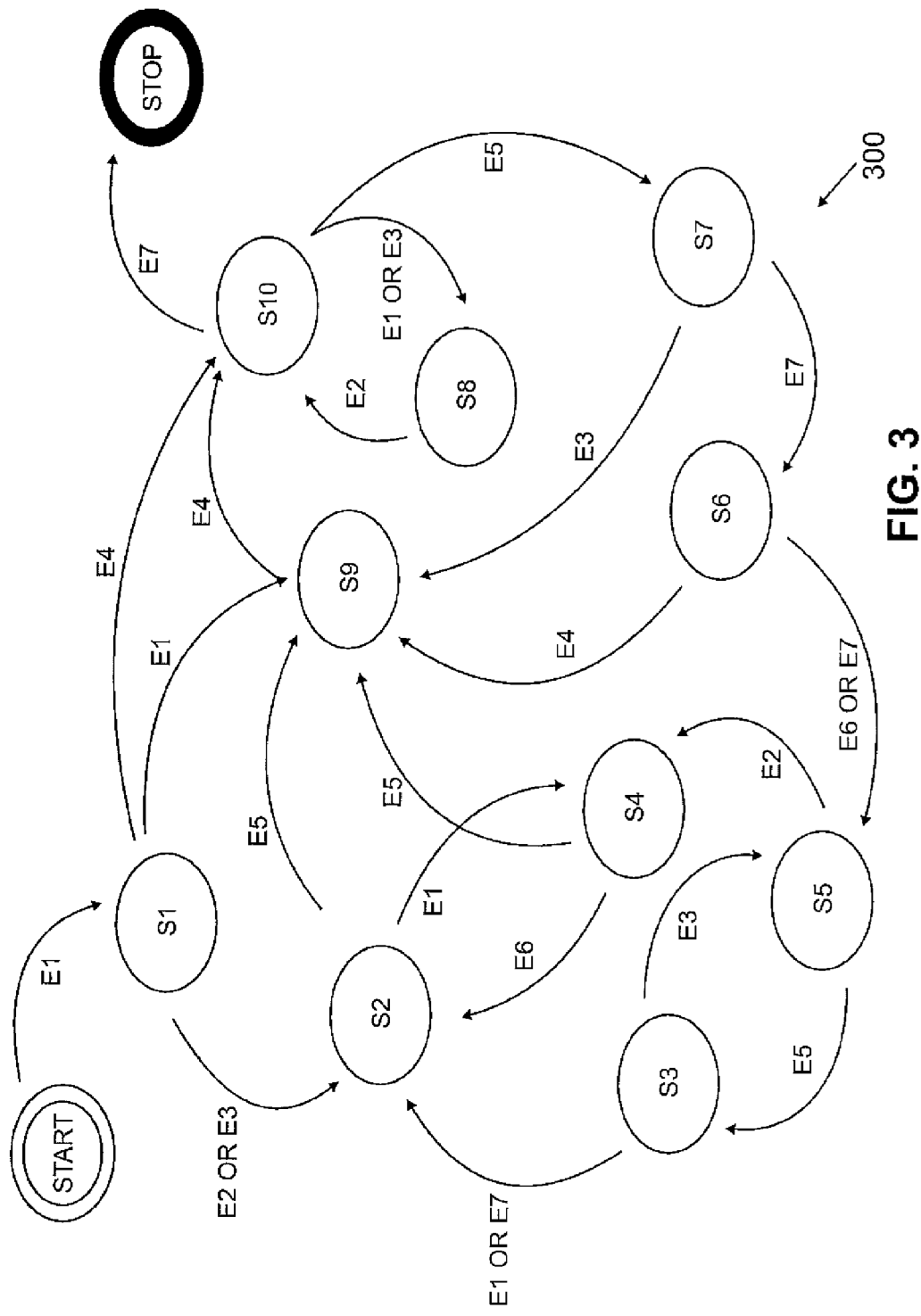
FIG. 3 is a bubble diagram for a finite state machine according to one embodiment of the disclosure.

FIG. 3 illustrates a bubble diagram 300 for a finite state machine table. Each of states S1-S10 is represented by a bubble and events E1-E7 cause transitions between states. These transitions are represented by the arrowed lines connecting the state bubbles. The arrowhead determines the direction of the transition.

Figure 4:
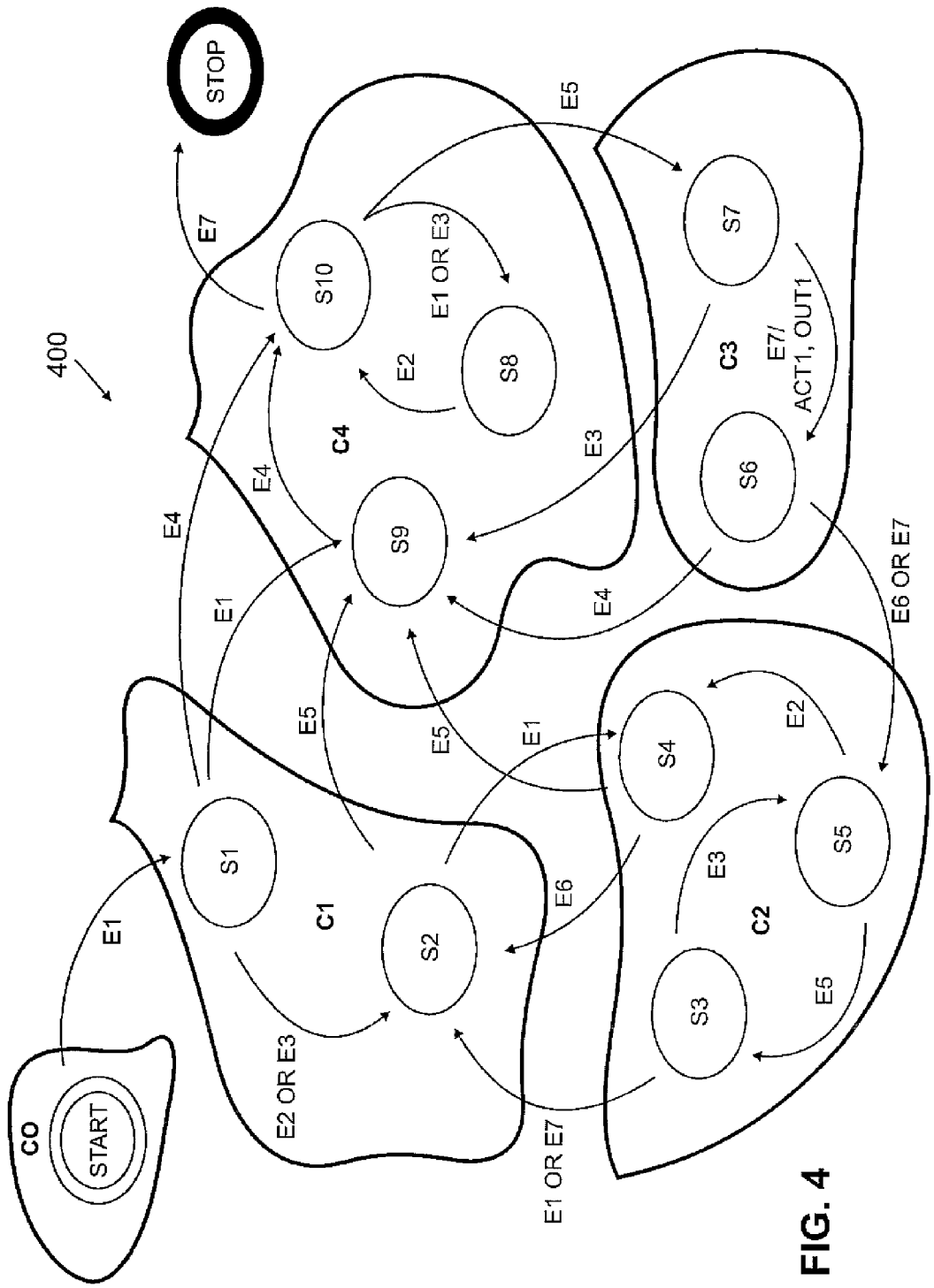
FIG. 4 is a bubble diagram showing context-based groupings of states in a finite state machine according to one embodiment of the disclosure.

It is noted that, in bubble diagram 300, it is possible to group states according to contexts of execution units. For the purposes of this disclosure, a context is a group of operations and/or instructions that are related to the same function. FIG. 4 illustrates bubble diagram 400, in which states of the finite state machine that are related to the same context are grouped together according to the principles of the present disclosure. The groupings of states form contexts C0, C1, C2, C3 and C4.

Each of the groupings of states in FIG. 4 may be used to create a context-based operation reconfigurable instruction set processor (CRISP) according to the principles of the present disclosure. Each of contexts C0-C4 comprises a minimum number of input events and a set of probable operations. Each context also has its own data path, which may comprise parallel execution units while the instruction set execution may be either in a VLIW, SIMD, microcode or other known implementation manner to increase the overall performance.

Figure 5:
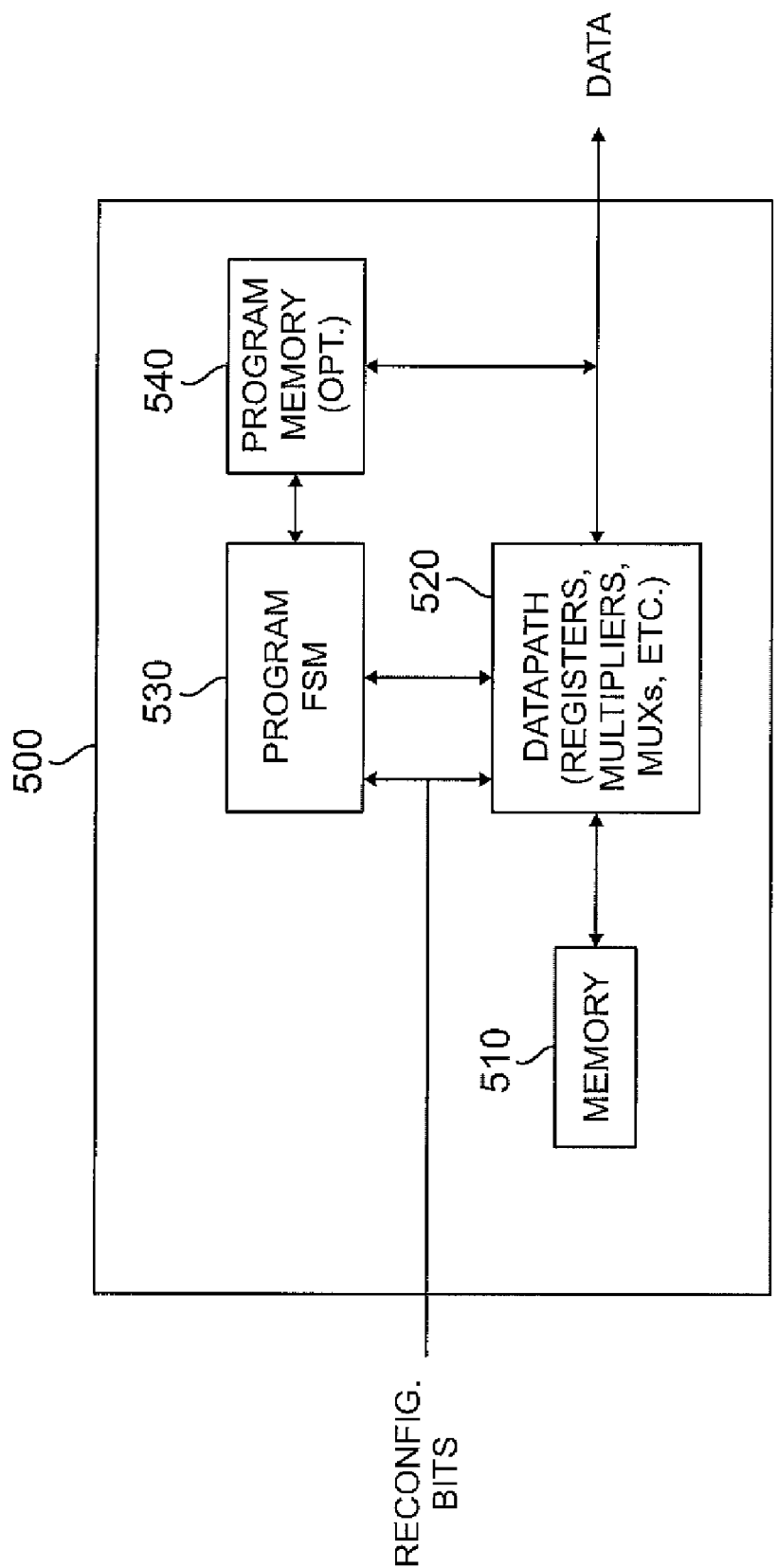
FIG. 5 is a block diagram of a context-based operation reconfigurable instruction set processor (CRISP) according to one embodiment of the disclosure.

FIG. 5 is a high-level block diagram of context-based operation reconfigurable instruction set processor (CRISP) 500, according to one embodiment of the present disclosure. CRISP 500 comprises memory 510, programmable data path circuitry 520, programmable finite state machine 530, and optional program memory 540. CRISP 500 is designed to implement only a subset of context-related instructions from FIG. 4 in an optimum manner. Each of the contexts C0-C4 in FIG. 4 may be implemented by a separate CRISP similar to CRISP 500. CRISP 500 defines the generic hardware block that usually consists of higher level hardware processor blocks. The principle advantage to CRISP 500 is that CRISP 500 breaks down the required application into two main domains, a control domain and a data path domain, and optimizes each domain separately. By implementing a data processor application, such as a mobile station handset (e.g., cell phone, wireless laptop), using CRISP 500, the flexibility vs. power problems that adversely affect conventional data processor applications may be at least partially overcome.

The control domain is implemented by programmable finite state machine 530, which may comprise a DSP, an MCU or another suitable device. Programmable FSM 530 is configured by reconfiguration bits received from an external controller (not shown). Programmable FSM 530 may execute a program stored in associated optional program memory 540. The program may be stored in program memory 540 via the DATA line from an external controller (not shown). Memory 510 is used to store application data used by data path circuitry 520.

Programmable data path circuitry 520 is divided into a set of building blocks that perform particular functions (e.g., registers, multiplexers, multipliers, and the like). Each of the building blocks is both reconfigurable and programmable to allow maximum flexibility. The criteria for dividing programmable data path circuitry 520 into functional blocks depends on the level of reconfigurability and programmability required for a particular application.

Since each of the contexts C0-C4 in FIG. 4 is implemented by a separate CRISP 500 that works independently of other CRISPs, an efficient power management scheme is provided that is able to shut down a CRISP when the CRISP is not required to execute. This assures that only the CRISPs that are needed at a given time are active, while other idle CRISPs do not consume any significant power.

A CRISP according to the principles of the present disclosure may be targeted to many applications, including, but not limited to, baseband applications in wireless devices and multimedia applications. In many applications, these contexts may be loosely-coupled independent contexts that may run concurrently with either minimum or no dependencies.

Figure 6:
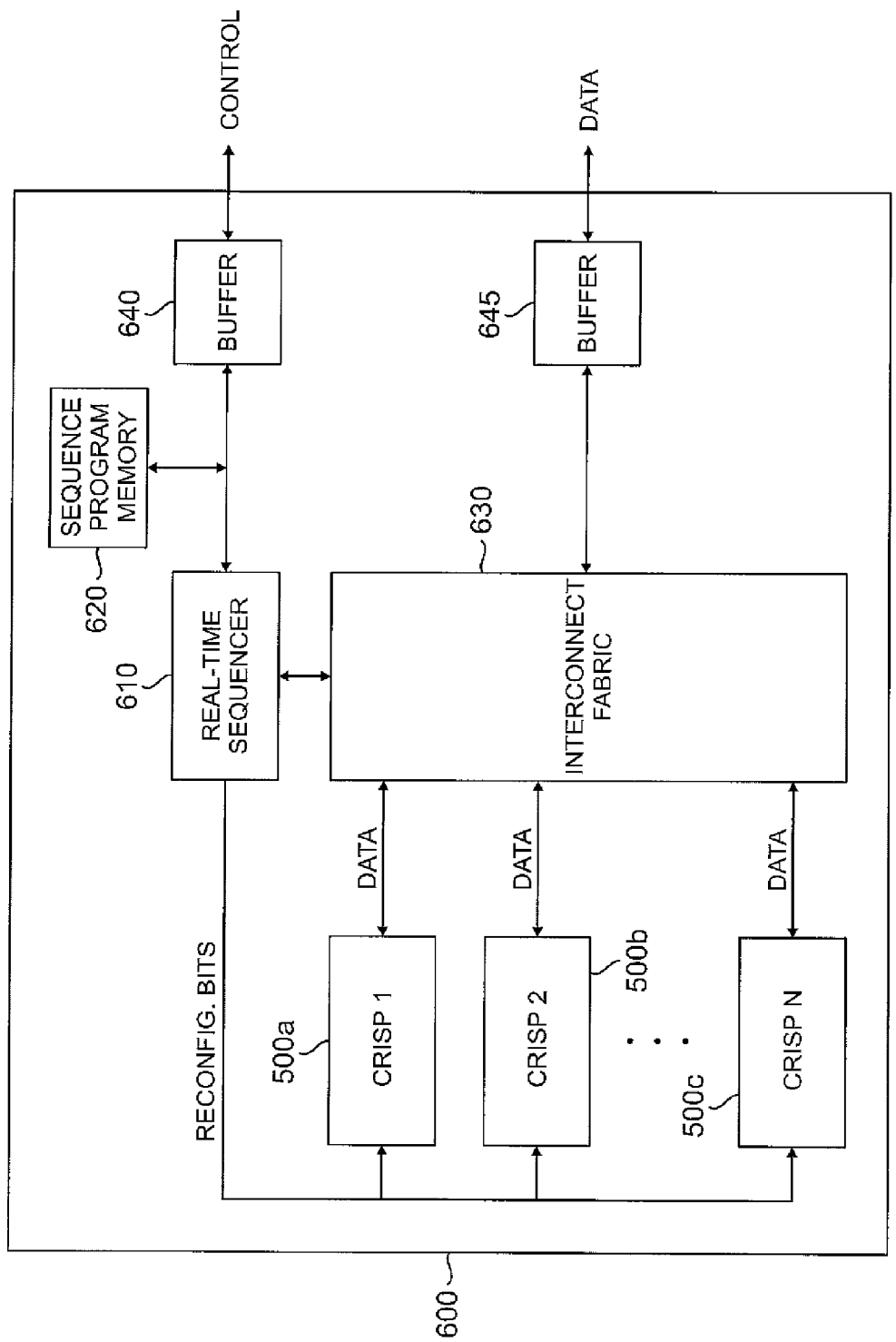
FIG. 6 is a block diagram of a reconfigurable processing system comprising a plurality of CRISPs according to one embodiment of the disclosure.

FIG. 6 is a high-level block diagram of reconfigurable processing system 600 according to one embodiment of the present disclosure. Reconfigurable processing system 600 comprises N context-based operation reconfigurable instruction set processors (CRISPs), including exemplary CRISPs 500*a*, 500*b*, and 500*c*, which are arbitrarily labeled CRISP 1, CRISP 2 and CRISP N. Reconfigurable processing system 600 further comprises real-time sequencer 610, sequence program memory 620, programmable interconnect fabric 630, and buffers 640 and 645.

Reconfiguration bits may be loaded into CRISPs 500*a*, 500*b*, and 500*c* from the CONTROL line via real-time sequencer 610 and buffer 640. A control program may also be loaded into sequence program memory 620 from the CONTROL line via buffer 640. Real-time sequencer 610 sequences the contexts to be executed by each one of CRISPs 500*a-c* by retrieving program instructions from program memory 620 and sending reconfiguration bits to CRISPs 500*a-c*. In one embodiment, real-time sequencer 610 may comprise a stack processor, which is suitable to operate as a real-time scheduler due to its low latency and simplicity.

Reconfigurable interconnect fabric 630 provides connectivity between each one of CRISPs 500*a-c* and an external DATA bus via bi-directional buffer 645. In one embodiment of the present disclosure, each one of CRISPs 500*a-c* may act as a master of reconfigurable interconnect fabric 630 and may initiate address access. The bus arbiter for reconfigurable interconnect fabric 630 may be internal to real-time sequencer 610.

In one embodiment, reconfigurable processing system 600 may be, for example, a cell phone or a similar wireless device or a data processor for use in a laptop computer. In a wireless device embodiment implemented according to software-defined radio (SDR) principles, each one of CRISPs 500*a-c* is responsible for executing a subset of context-related instructions that are associated with a particular reconfigurable function. For example, CRISP 500*a* may be configured to execute context-related instructions that process HSDPA baseband signals, CDMA baseband signals or OFDMA baseband signals. CRISP 500*b* may be configured to execute context-related instructions that act as a memory controller. CRISP 500*c* may be configured to execute context-related instructions that perform MPEG-4 processing for multimedia applications.

A CRISP according to the principles of the present disclosure provides a new way of implementing reconfigurable hardware acceleration techniques and also provides reconfigurability and programmability with minimal sacrifice of power efficiency. Since the CRISPs are largely independent and may be run simultaneously, the performance advantage of parallelism is provided without incurring the full power penalty associated with running parallel operations. The loose coupling and independence of CRISPs allows them to be configured for different systems and functions that may be shut down separately.

Figure 7:
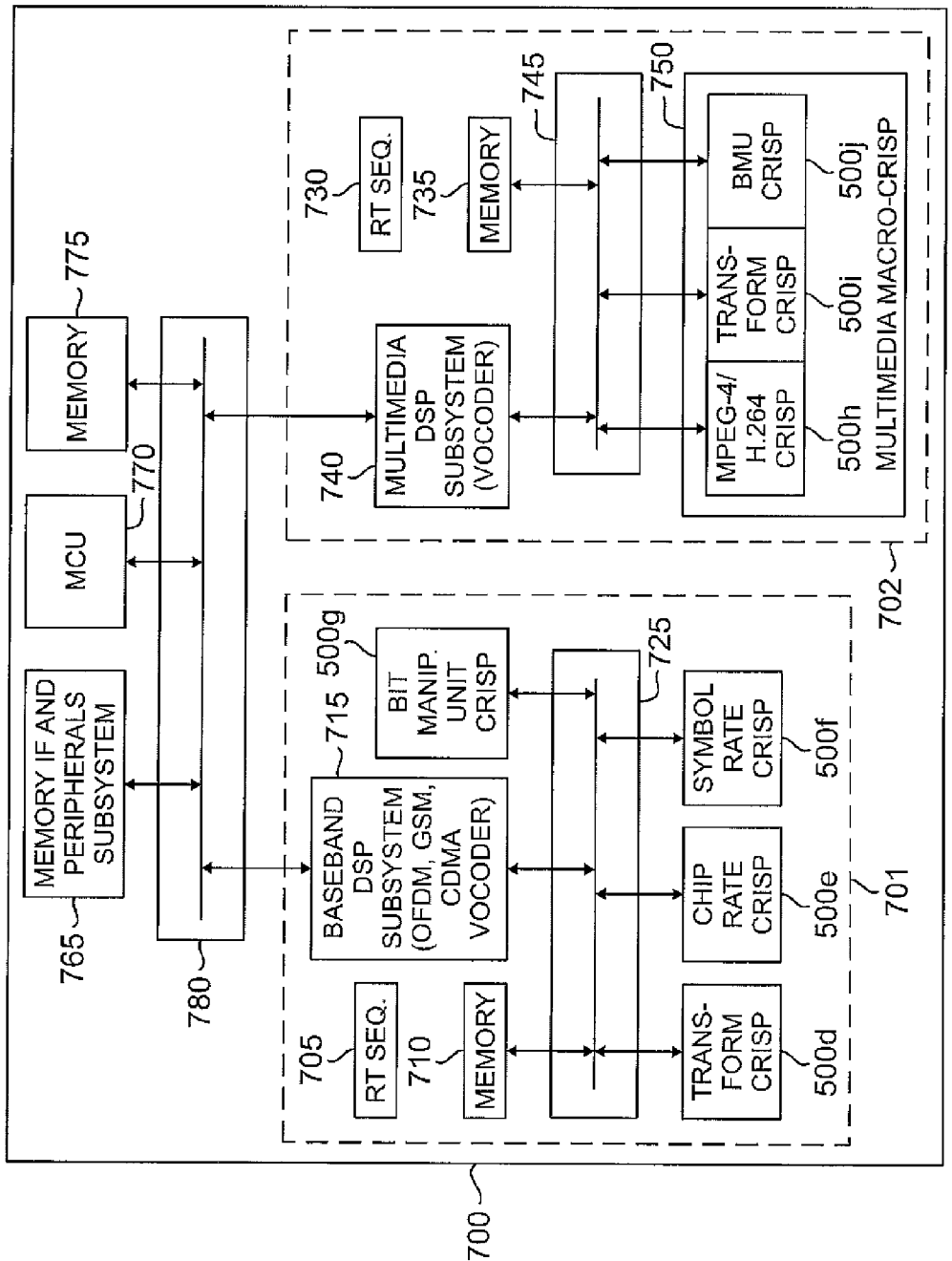
FIG. 7 is a block diagram of a multi-standard SDR system comprising a plurality of CRISPs according to one embodiment of the disclosure.

FIG. 7 is a high-level block diagram of multi-standard software-defined radio (SDR) system 700, which comprises a plurality of context-based operation reconfigurable instruction set processors (CRISPS), according to one embodiment of the present disclosure. SDR system 700 may comprise a wireless terminal (or mobile station) that accesses a wireless network, such as, for example, a GSM, CDMA or HSDPA cellular telephone, a PDA with WCDMA, HSDPA or IEEE-802.11x capabilities, or the like.

Multi-standard SDR system 700 comprises baseband subsystem 701, applications subsystem 702, memory interface (IF) and peripherals subsystem 765, main control unit (MCU) 770, memory 775, and interconnect 780. MCU 770 may comprise, for example, a conventional microcontroller or a microprocessor (e.g., x86, ARM, RISC, DSP, etc.). Memory IF and peripherals subsystem 765 may connect SDR system 700 to an external memory (not shown) and to external peripherals (not shown). Memory 775 stores data from other components in SDR system 700 and from external devices (not shown). For example, memory 775 may store a stream of incoming data samples received from an external antenna system and an RF down-converter associated with SDR system 700. Interconnect 780 provides data transfer between subsystems 701 and 702, memory IF and peripherals subsystem 765, MCU 770, and memory 775.

Baseband subsystem 701 comprises real-time (RT) sequencer 705, memory 710, baseband DSP subsystem 715, interconnect 725, and a plurality of special purpose context-based operation instruction set processors (CRISPs), including transform CRISP 500$d$, chip rate CRISP 500$e$, symbol rate CRISP 500$f$, and bit manipulation unit (BMU) CRISP 500$g$. By way of example, transform CRISP 500$d$ may implement a Fast Fourier Transform (FFT) function, chip rate CRISP 500$e$ may implement a correlation function for a CDMA or HSDPA signal, and symbol rate CRISP 500$f$ may implement a Viterbi decoder function.

In such an embodiment, transform CRISP 500$d$ may receive samples of an intermediate frequency (IF) signal stored in memory 775 and perform an FFT function that generates a sequence of chip samples at a baseband rate. Next, chip rate CRISP 500$e$ receives the chip samples from transform CRISP 500$d$ and performs a correlation function that generates a sequence of data symbols. Next, symbol rate CRISP 500$f$ receives the symbol data from chip rate CRISP 500$e$ and performs Viterbi decoding to recover the baseband user data. The baseband user data may then be used by applications subsystem 702.

In one embodiment of the present disclosure, symbol rate CRISP 500$f$ may comprise two or more CRISPs that operate in parallel. Also, by way of example, BMU CRISP 500$g$ may implement such functions as variable length coding, cyclic redundancy check (CRC), convolutional encoding, and the like. Interconnect 725 provides data transfer between RT sequencer 705, memory 710, baseband DSP subsystem 715 and CRISPs 500$d$-500$g$.

Applications subsystem 702 comprises real-time (RT) sequencer 730, memory 735, multimedia DSP subsystem 740, interconnect 745, and multimedia macro-CRISP 750. Multimedia macro-CRISP 750 comprises a plurality of special purpose CRISPs, including MPEG-4/H.264 CRISP 550$h$, transform CRISP 550$i$, and BMU CRISP 500$j$. In one embodiment of the present disclosure, MPEG-4/H.264 CRISP 550$h$ performs motion estimation functions and transform CRISP 500$h$ performs a discrete cosine transform (DCT) function. Interconnect 745 provides data transfer between RT sequencer 730, memory 735, multimedia DSP subsystem 740, and multimedia macro-CRISP 750.

In the embodiment shown in FIG. 7, the use of CRISP devices enables applications subsystem 702 of multi-standard SDR system 700 to be reconfigured to support multiple video standards with multiple profiles and sizes. Additionally, the use of CRISP devices enables baseband subsystem 701 of multi-standard SDR system 700 to be reconfigured to support multiple air interface standards. Thus, SDR system 700 is able to operate in different types of wireless networks (e.g., HSDPA, CDMA, GSM, 802.11x, etc.) and can play different types of video and audio formats. However, the use of CRISPs according to the principles of the present disclosure enables SDR system 700 to perform these functions with much lower power consumption than conventional wireless devices having comparable capabilities.

More particularly, the present disclosure provides a reconfigurable correlation unit that may be implemented in a context-based operation reconfigurable instruction set processor. Advantageously, a correlation unit according to the principles of the present disclosure is highly reconfigurable and may be used for different functional blocks operating under different standards, including CDMA de-spreading, IEEE-802.11b CCK demodulation, WCDMA de-spreading, cell search, HSDPA de-spreading, and the like.

Figure 8:
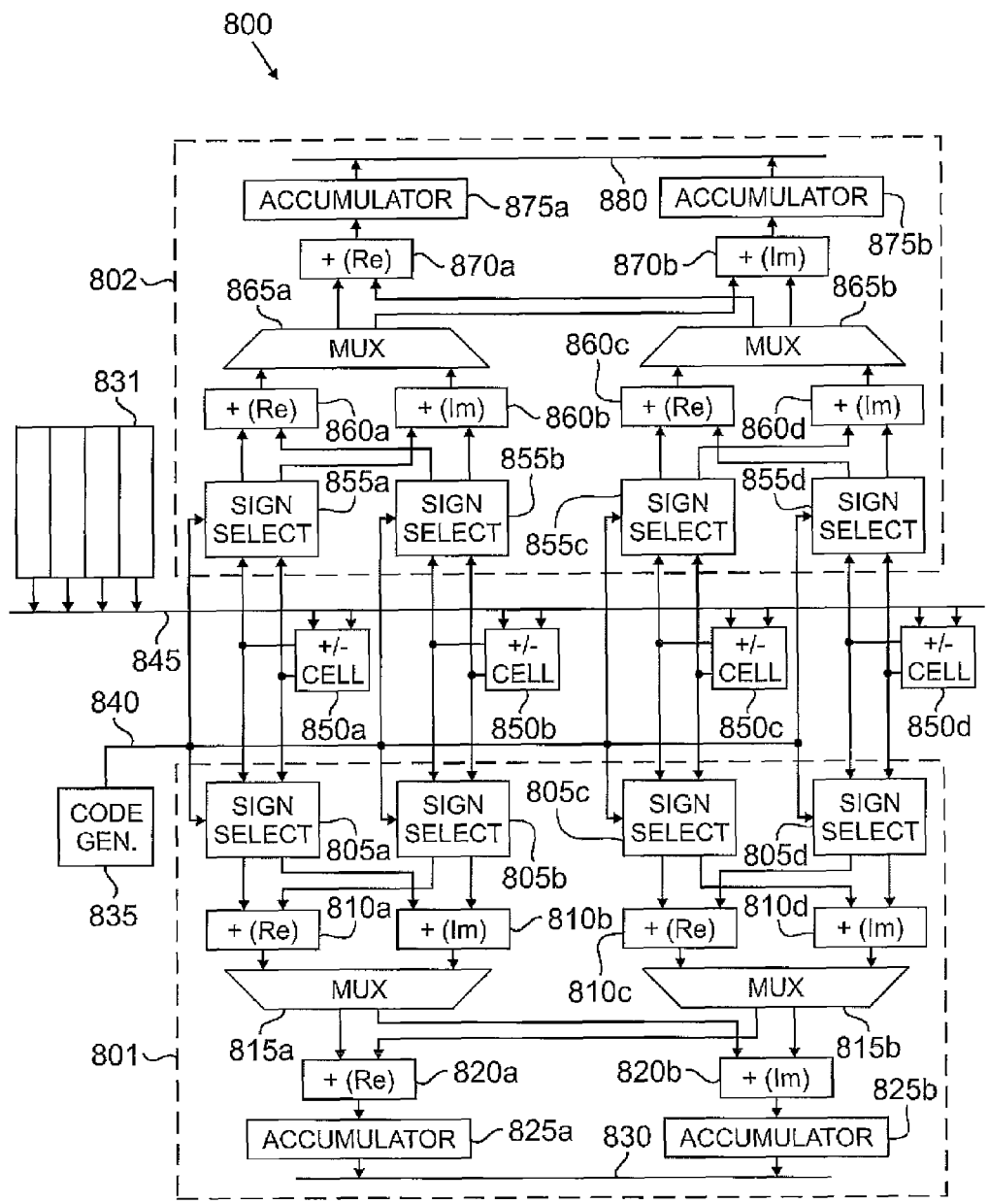
FIG. 8 is a block diagram of a correlation unit, including a code generator operable to generate parallel codes, according to one embodiment of the disclosure.

FIG. 8 is a block diagram of reconfigurable correlation unit 800 according to one embodiment of the present disclosure. Correlation unit 800 may be implemented as part of chip rate CRISP 500$e$, for example. Correlation unit 800 comprises three main parts: data memory 831, code generator 835, and a processing unit.

In the illustrated embodiment, the processing unit is implemented as two substantially identical processing sub-blocks, namely lower processing unit 801 and upper processing unit 802. Correlation unit 800 further comprises code bus 840, data bus 845, and four add-subtract (±) cells 850$a$-850$d$.

Lower processing unit 801 comprises four sign select units 805$a$-805$d$, four first stage adders 810$a$-810$d$, multiplexers (MUXes) 815$a$ and 815$b$, two second stage adders 820$a$ and 820$b$, accumulators 825$a$ and 825$b$, and output bus 830. Upper processing unit 802 comprises four sign select units 855$a$-855$d$, four first stage adders 860$a$-860$d$, multiplexers (MUXes) 865$a$ and 865$b$, two second stage adders 870$a$ and 870$b$, accumulators 875$a$ and 875$b$, and output bus 880.

Lower processing unit 801 and upper processing unit 802 operate independently. According to one embodiment of the present disclosure, code bus 840, data bus 845, and output buses 830 and 880 are unidirectional buses. Furthermore, in an advantageous embodiment of the present disclosure, output bus 830 and output bus 880 may be the same bus. For this reason, output bus 830 and output bus 880 will hereafter be referred to only as "output bus 830." Data bus 845 sends the chip sample data from data memory 831 to processing units 801 and 802 via cells 850$a$-850$d$. Output bus 830 writes output data from accumulators 825$a$ and 825$b$ and accumulators 875$a$ and 875$b$ to data memory 831. Code bus 840 conveys the code data generated in code generator 835 to processing units 801 and 802.

It should be noted that processing units 801 and 802, memory 831, code generator 835, and buses 830, 840, 845 and 880 may be configured for different standards and functions, including CDMA de-spreading, IEEE-802.11b CCK demodulation, WCDMA de-spreading, cell search, HSDPA de-spreading, and the like. Furthermore, each of the functional components and each of the buses may be shut down independently. The number of cells 850, the width of data memory 831, and the number of sign select units 805 and 855 illustrated and described in FIG. 8 are by way of example only. As will be seen below, the number of processing units 801 and 802 and the sizes of cells 850, data memory 831, and sign select units 805 and 855 may be varied (e.g., increased or decreased) without departing from the scope of the disclosure.

Figure 9:
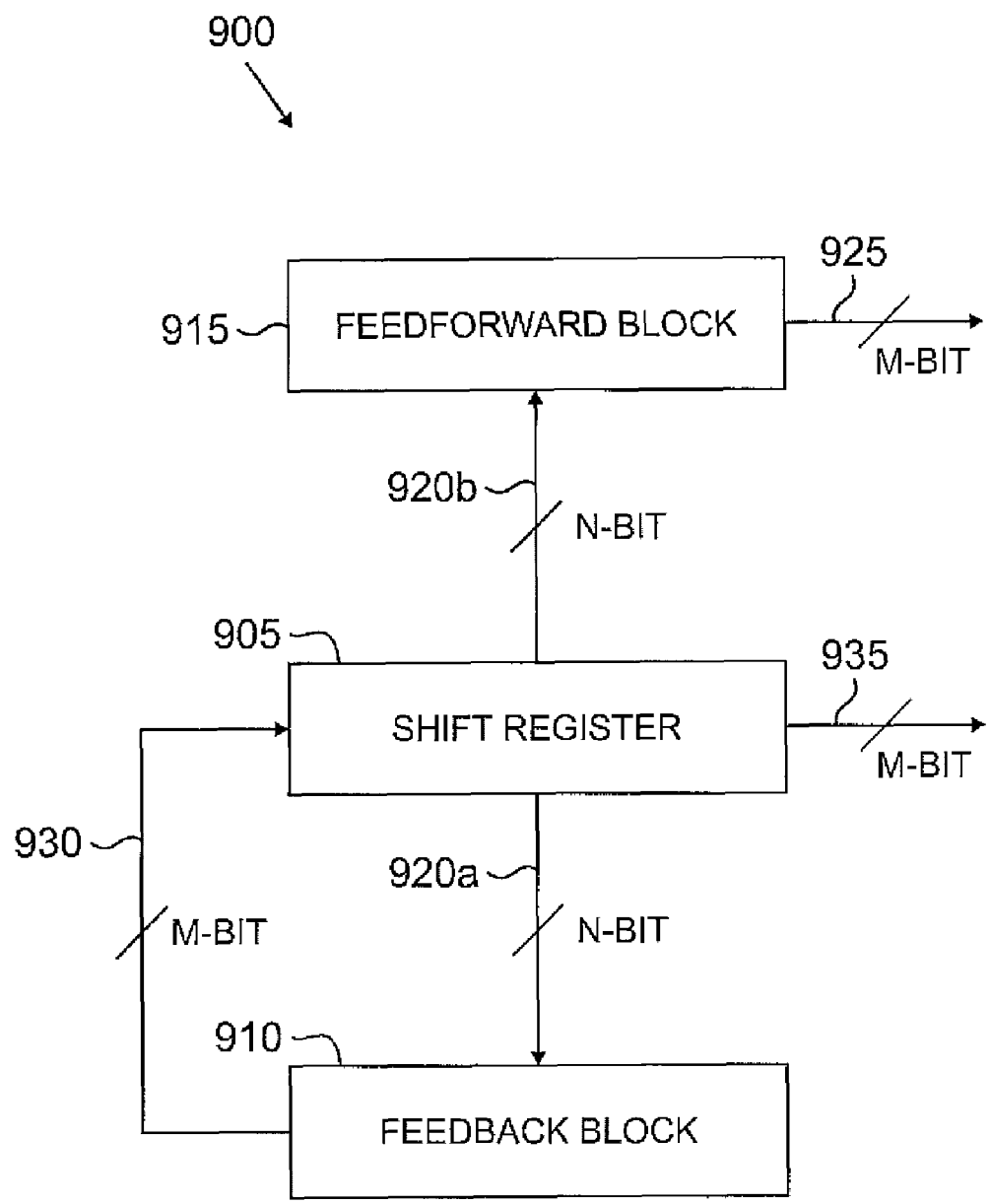
FIG. 9 is a block diagram of a portion of the code generator of FIG. 2A, 2B or 8 according to one embodiment of the disclosure.

FIG. 9 is a block diagram of a portion of a parallel code generator 900 according to one embodiment of the disclosure.

Parallel code generator 900 may be implemented in transmitter 200 as parallel code generator 205, in receiver 250 as parallel code generator 255 and/or in correlation unit 800 as code generator 835. However, it will be understood that parallel code generator 900 may be implemented in any other suitable system or component without departing from the scope of the present disclosure.

Parallel code generator 900 comprises a single code generator and is operable to generate parallel codes. For one embodiment, parallel code generator 900 is operable to generate parallel scrambling codes. For the illustrated embodiment, parallel code generator 900 comprises a shift register 905, a feedback block 910 and a feedforward block 915. Also, for the illustrated embodiment, parallel code generator 900 is operable to generate two sets of M outputs during each clock cycle that may be used in generating M codes in parallel.

The portion of parallel code generator 900 illustrated in FIG. 9 corresponds to a single branch of code generation. For example, the outputs generated by the illustrated portion may correspond to a WCDMA I branch or to a WCDMA Q branch. Thus, similar components may be implemented to generate the outputs for the remaining branch.

Shift register 905 may comprise an N-bit shift register. For one embodiment, shift register 905 is operable to provide a first shift register output 920a of N bits to feedback block 910 and a second shift register output 920b of N bits to feedforward block 915. For the embodiment in which shift register 905 comprises an N-bit shift register, the first shift register output 920a may be equivalent to the second shift register output 920b. For this embodiment, each shift register output 920a and 920b comprises the N bits stored in shift register 905.

Based on the first shift register output 920a received from shift register 905, feedback block 910 is operable to generate a feedback output 930, which may comprise M bits, and to provide the feedback output 930 back to shift register 905. Based on the second shift register output 920b received from shift register 905, feedforward block 915 is operable to generate a first set of outputs 925 for parallel code generator 900. According to one embodiment, the first set of outputs 925 comprises M bits. Shift register 905 is operable to generate a second set of outputs 935 for parallel code generator 900. According to one embodiment, the second set of outputs 935 also comprises M bits.

For one example, shift register 905 may be shifted by M bits with each clock cycle. Thus, with each clock cycle, the M-bit feedback output 930 may be shifted into shift register 905, and another M bits may be shifted out of shift register 905 as the second set of outputs 935.

For one embodiment, feedback block 910 comprises one or more XOR selectors that are operable to generate the feedback output 930 by XORing predetermined bits in shift register 905 based on the first shift register output 920a. For this embodiment, feedforward block 915 comprises one or more XOR selectors that are operable to generate the first set of outputs 925 by XORing predetermined bits in shift register 905 based on the second shift register output 920b.

For a particular embodiment, parallel code generator 900 comprises a scrambling code generator. For this embodiment, the second set of outputs 935 provide x-values and the first set of outputs 925 provide corresponding z-values. The portion of parallel code generator 900 not illustrated in FIG. 9 is operable to generate M scrambling codes in parallel based on the M x-values 935 and M z-values 925 that are generated during each clock cycle. Thus, for this embodiment, parallel code generator 900 is operable to use each pair of x-value and corresponding z-value outputs 935 and 925 in the generation of a different scrambling code.

For the embodiment in which parallel code generator 900 is implemented as code generator 835 of correlation unit 800, parallel code generator 900 may be operable to generate four codes in parallel based on the four cells 850a-d, which are each operable to receive a different code generated by parallel code generator 900. However, it will be understood that parallel code generator 900 may be operable to generate any suitable number of codes in parallel without departing from the scope of this disclosure.

In operation, for one example, shift register 905 comprises N bits and provides those N bits to feedback block 910 as the first shift register output 920a and to feedforward block 915 as the second shift register output 920b. Feedback block 910 XORs predetermined bits of the N-bit first shift register output 920a to generate the M-bit feedback output 930. Feedforward block 915 XORs predetermined bits of the N-bit second shift register output 920b to generate the first set of M outputs 925. Shift register 905 shifts out M bits in the form of the second set of outputs 935 while shifting in the M-bit feedback output 930. In this way, parallel code generator 900 may generate M parallel codes using a single code generator and without storing pre-calculated codes.

Figure 10:
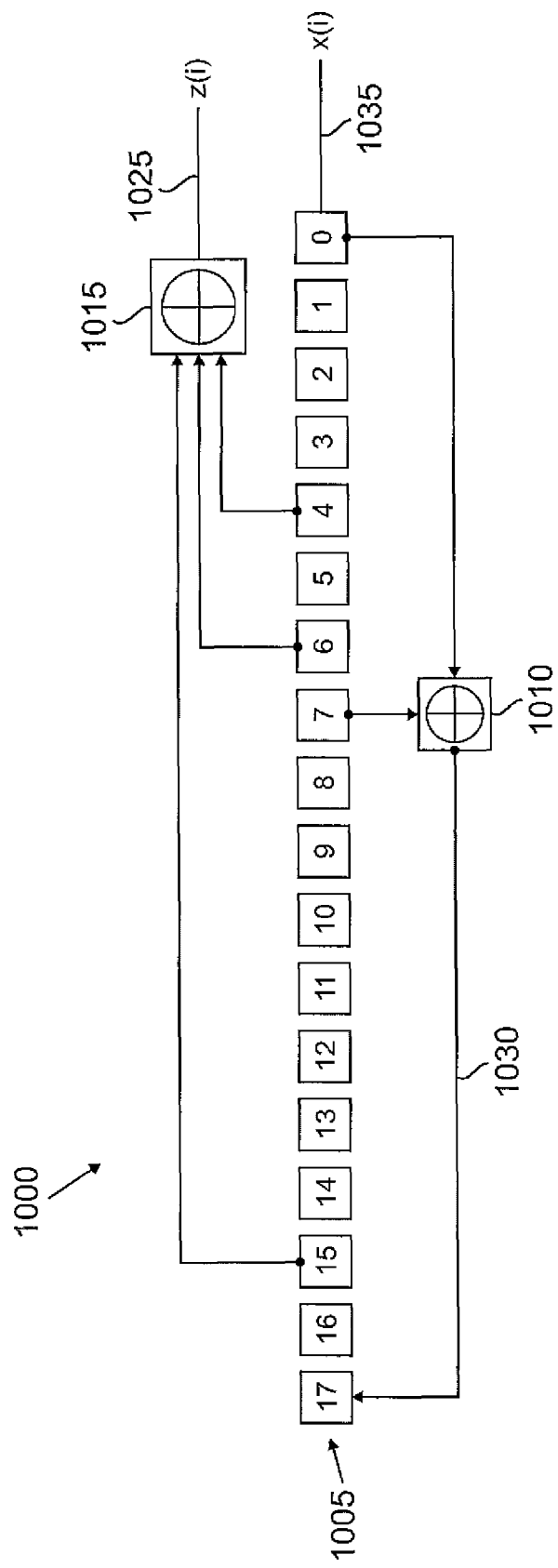
FIG. 10 illustrates scrambling code generation according to one embodiment of the disclosure.

FIG. 10 illustrates scrambling code generation 1000 according to one embodiment of the disclosure. This embodiment illustrates details corresponding to parallel code generator 900 for a single scrambling code as opposed to parallel scrambling codes. Thus, FIG. 10 is a simplified block diagram to illustrate the concept of the operation of parallel code generator 900 according to a particular embodiment. It will be understood that parallel code generator 900 generates parallel scrambling codes in a manner similar to the single scrambling code generated using the illustrated scrambling code generation 1000.

For this embodiment, scrambling code generation 1000 is provided by shift register 1005, feedback block 1010 and feedforward block 1015. For generating a scrambling code for use in a WCDMA system, for example, the following equations are provided by the WCDMA standards:

$$x(i+18)=x(i+7)+x(i) \text{ and}$$

$$z(i)=x(i+4)+x(i+6)+x(i+15).$$

As a result, for this example, the predetermined bits used by feedback block 1010 and feedforward block 1015 are defined by these equations. Thus, feedforward block 1015 generates first output 1025 by XORing $x(i+4)$, $x(i+6)$ and $x(i+15)$. In addition, feedback output 1030 is shifted into shift register 1005 from feedback block 1010 and second output 1035 is shifted out of shift register 1005.

Figure 11:
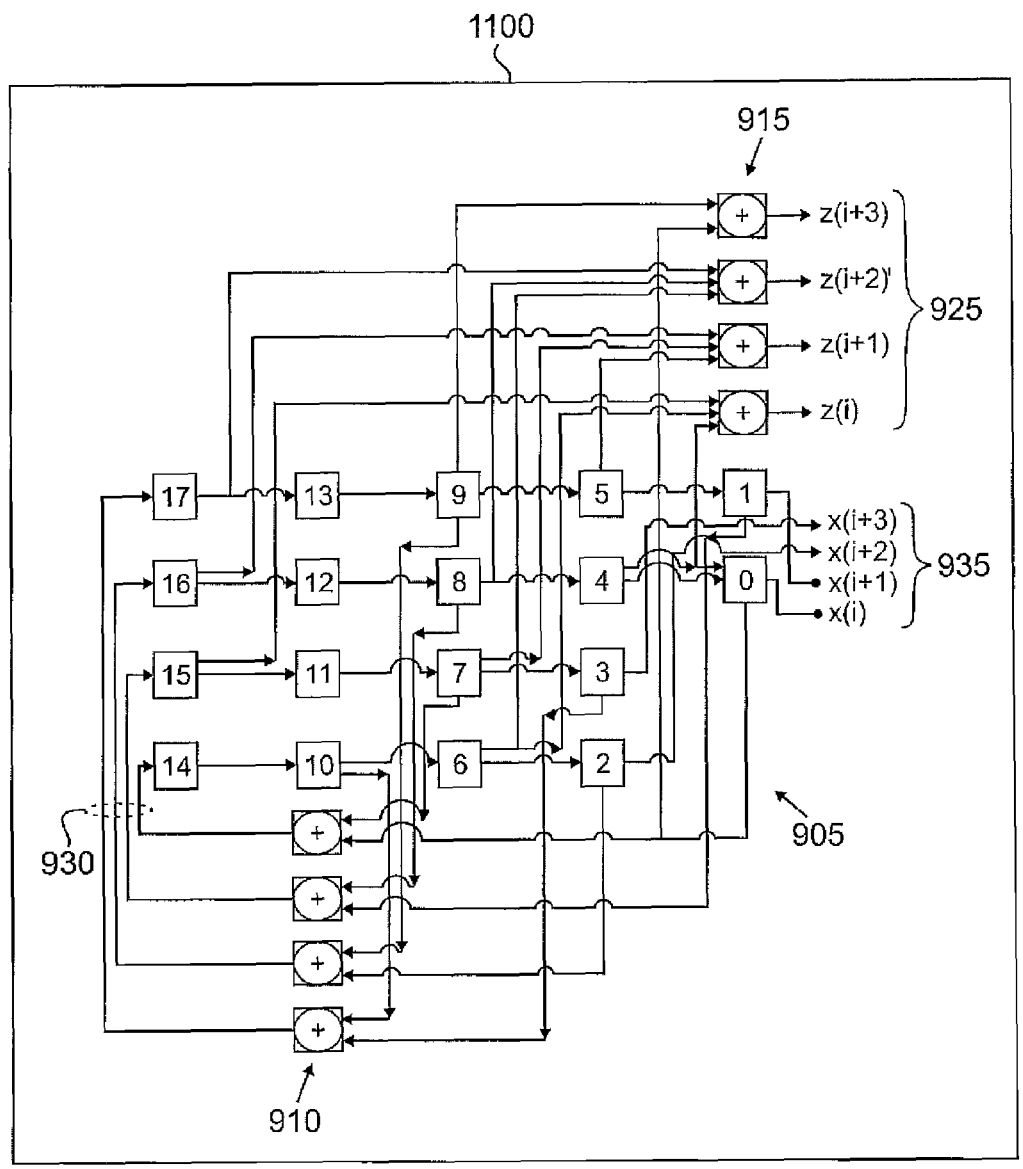
FIG. 11 illustrates parallel scrambling code generation using the code generator of FIG. 9 according to one embodiment of the disclosure.

FIG. 11 illustrates parallel scrambling code generation 1100 using parallel code generator 900 according to one embodiment of the disclosure. For this embodiment, parallel code generator 900 is operable to generate four parallel scrambling codes. It will be understood that this is one particular embodiment of parallel code generator 900 and that parallel code generator 900 may be similarly implemented in such a manner as to provide for any suitable number of parallel scrambling codes.

Using the equations for x-values and z-values for WCDMA systems defined above in connection with FIG. 10, the following equations result:

$$z(i+1)=x(i+5)+x(i+7)+x(i+16),$$

$$z(i+2)=x(i+6)+x(i+8)+x(i+17), \text{ and}$$

$$z(i+3)=x(i+7)+x(i+9)+x(i+18)=x(i+9)+x(i).$$

The embodiment of FIG. 11 implements parallel code generator 900 such that the equations for $z(i+0 \ldots 3)$, as defined above, may be used as a basis for generating four parallel scrambling codes. Thus, for the illustrated embodiment, parallel code generator 900 is operable to generate four bits of feedback output 930 and shift register 905 is operable to shift by four with each clock cycle, resulting in a set of four first outputs 925 (that are the four z-values) and a set of four second outputs 935 (that are the four x-values) with each clock cycle. Parallel code generator 900 may then use these outputs 925 and 935 to generate four parallel scrambling codes.

For this embodiment, shift register 905 comprises an eighteen-bit shift register, feedback block 910 comprises four XOR selectors, and feedforward block 915 comprises four XOR selectors. The connections shown between the components 905, 910 and 915 illustrate how the predetermined feedback bits and predetermined feedforward bits, which are determined by the above equations, may be used to generate the outputs 925 and 935.

Figure 12:
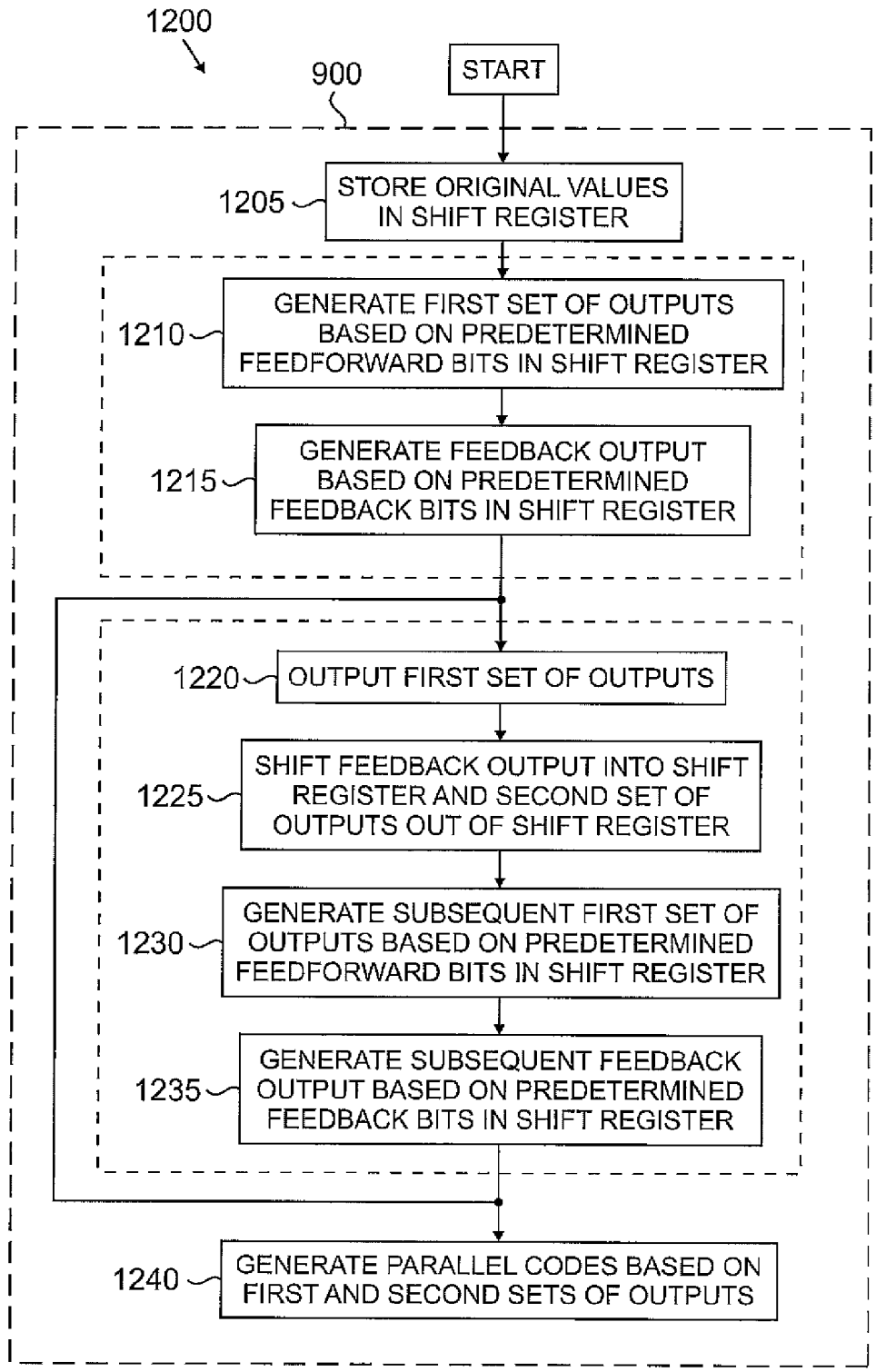
FIG. 12 is a flow diagram illustrating a method for generating parallel code using the code generator of FIG. 9 according to one embodiment of the disclosure.

FIG. 12 is a flow diagram illustrating a method 1200 for generating parallel code using parallel code generator 900 according to one embodiment of the disclosure. Initially, original values are stored in shift register 905 (process step 1205). After this, steps 1210 and 1215 are performed during one clock cycle, and steps 1220, 1225, 1230 and 1235 are performed during a subsequent clock cycle (and are repeated for additional clock cycles as indicated by the loop in FIG. 12).

Feedforward block 915 generates a first set of outputs 925 based on predetermined feedforward bits in shift register 905 (process step 1210). For example, feedforward block 915 may XOR M sets of predetermined bits to generate M first outputs 925. For a particular embodiment, M may comprise four; however, other values of M may be used.

Feedback block 910 generates a feedback output 930 based on predetermined feedback bits in shift register 905 (process step 1215). For example, feedback block 910 may XOR M sets of predetermined bits to generate an M-bit feedback output 930.

With the subsequent clock cycle, as described above, feedforward block 915 outputs the first set of outputs 925 (process step 1220). Meanwhile, the feedback output 930 is shifted into shift register 905 and a second set of M outputs 935 is shifted out of shift register 905 (process step 1225).

Also during this clock cycle, feedforward block 915 generates a subsequent first set of outputs 925 based on the predetermined feedforward bits in shift register 905, which have changed based on the shifting of shift register 905 (process step 1230). Feedback block 910 also generates a subsequent feedback output 930 based on the predetermined feedback bits in shift register 905, which have also changed based on the shifting of shift register 905 (process step 1235). At this point, the method returns to process step 1220 and parallel code generator 900 continues to output M first outputs 925 and M second outputs 935 for each subsequent clock cycle.

In addition, while subsequent sets of first and second outputs 925 and 935 are being generated, parallel code generator 900 is generating M codes in parallel based on the first and second sets of outputs 925 and 935 that are being generated (process step 1240). Therefore, for the example above with M=4, parallel code generator 900 generates four codes in parallel with each other, with each code generated based on a different one of the four pairs of outputs. For the embodiment described in connection with FIG. 10, for example, a first scrambling code may be generated based on x(i) and z(i), a second scrambling code may be generated based on x(i+1) and z(i+1), a third scrambling code may be generated based on x(i+2) and z(i+2), and a fourth scrambling code may be generated based on x(i+3) and z(i+3).

In this way, parallel code generator 900 may be used to generate parallel codes based on parallel outputs 925 and 935 by determining future bit values for shift register 905. For example, using logic connections such as those illustrated in FIG. 11, parallel code generator 900 is operable to determine the bit values that would be in shift register 905 several clock cycles ahead if shift register 905 were shifted by a single bit with each clock cycle instead of by multiple bits. Parallel code generator 900 may then use those future bit values to determine future outputs 925 and 935 in order to generate more than one code at a time, essentially generating the future codes at the same time as a current code.

Therefore, parallel code generator 900 is operable to generate parallel codes using a single code generator, resulting in reduced power consumption relative to code generators that generate codes faster by operating based on a faster clock and also resulting in decreased die area relative to systems employing duplicate code generators. In addition, memory is not wasted storing pre-calculated scrambling codes.

Although the present invention has been described with one embodiment, various changes and modifications may be suggested to one skilled in the art. It is intended that the present invention encompass such changes and modifications as fall within the scope of the appended claims.

What is claimed is:

1. A method for generating parallel codes, comprising:
generating a plurality of pairs of outputs for each clock cycle using a single code generator; and
generating a code based on each pair of outputs using the single code generator, wherein each pair of outputs comprises a first output and a corresponding second output, and wherein generating the pairs of outputs for each clock cycle comprises storing a plurality of bits in a shift register.

2. The method as set forth in claim 1, wherein generating the pairs of outputs for each clock cycle further comprises:
generating the first outputs based on predetermined feedforward bits in the shift register; and
generating the second outputs by shifting a predetermined number of bits out of the shift register.

3. The method as set forth in claim 2, generating the pairs of outputs for each clock cycle further comprising:
generating a feedback output based on predetermined feedback bits in the shift register; and
shifting the feedback output into the shift register when the predetermined number of bits is shifted out of the shift register to generate the second outputs.

4. The method as set forth in claim 3, storing the plurality of bits in the shift register comprising storing eighteen bits in the shift register, generating the plurality of pairs of outputs for each clock cycle comprising generating four pairs of outputs for each clock cycle.

5. The method as set forth in claim 4,
generating the first outputs based on predetermined feedforward bits in the shift register comprising generating the first outputs by XORing the predetermined feedforward bits; and
generating the feedback output based on predetermined feedback bits in the shift register comprising generating the feedback output by XORing the predetermined feedback bits.

6. The method as set forth in claim 5, the bits stored in the shift register represented by $x(i+n)$, with n representing the bit values of 0 to 17 in the shift register, the first outputs represented by $z(i)$, $z(i+1)$, $z(i+2)$ and $z(i+3)$ and generated based on the following equations:

$$z(i)=x(i+4)+x(i+6)+x(i+15),$$

$$z(i+1)=x(i+5)+x(i+7)+x(i+16),$$

$$z(i+2)=x(i+6)+x(i+8)+x(i+17), \text{ and}$$

$$z(i+3)=x(i+9)+x(i).$$

7. A system for generating parallel codes, comprising:
- a feedforward block operable to generate a plurality of first outputs with each clock cycle;
- a shift register coupled to the feedforward block, the shift register operable to store a plurality of bits and to generate a corresponding second output for each first output with each clock cycle, each first output and corresponding second output comprising a pair of outputs; and
- a feedback block coupled to the shift register, the feedback block operable to generate a feedback output for the shift register, the system operable to generate parallel codes, each code generated based on one of the pairs of outputs.

8. The system as set forth in claim 7, the feedforward block operable to generate the first outputs based on predetermined feedforward bits in the shift register.

9. The system as set forth in claim 8, the feedback block operable to generate the feedback output based on predetermined feedback bits in the shift register.

10. The system as set forth in claim 9, the shift register operable to generate the second outputs by shifting the feedback output into the shift register and shifting the second outputs out of the shift register.

11. The system as set forth in claim 10, the feedforward block operable to generate four first outputs with each clock cycle, and the shift register operable to store eighteen bits and to generate four second outputs with each clock cycle.

12. The system as set forth in claim 11, the bits stored in the shift register represented by x(i+n), with n representing the bit values of 0 to 17 in the shift register, the first outputs represented by z(i), z(i+1), z(i+2) and z(i+3), the feedforward block operable to generate the first outputs based on the following equations:

$$z(i)=x(i+4)+x(i+6)+x(i+15),$$

$$z(i+1)=x(i+5)+x(i+7)+x(i+16),$$

$$z(i+2)=x(i+6)+x(i+8)+x(i+17), \text{ and}$$

$$z(i+3)=x(i+9)+x(i).$$

13. The system as set forth in claim 9, the feedback block comprising at least one XOR selector operable to generate the feedback output by XORing the predetermined feedback bits.

14. The system as set forth in claim 8, the feedforward block comprising at least one XOR selector operable to generate the first outputs by XORing the predetermined feedforward bits.

15. The system as set forth in claim 7, the feedforward block operable to generate four first outputs with each clock cycle, the feedback output comprising four bits, the shift register operable to generate four second outputs with each clock cycle, and the system operable to generate four parallel codes.

16. A correlation unit operable to process data using parallel codes, comprising:
- a single code generator operable to generate parallel codes;
- a plurality of add-subtract cells, each add-subtract cell operable to receive a plurality of cell inputs and to generate a plurality of cell outputs based on the cell inputs; and
- at least one processing unit coupled to the code generator and to the add-subtract cells, the processing unit operable to process the cell outputs and the parallel codes to generate a plurality of accumulated results.

17. The correlation unit as set forth in claim 16, the code generator comprising:
- a feedforward block operable to generate a plurality of first outputs with each clock cycle;
- a shift register coupled to the feedforward block, the shift register operable to store a plurality of bits and to generate a corresponding second output for each first output with each clock cycle, each first output and corresponding second output comprising a pair of outputs; and
- a feedback block coupled to the shift register, the feedback block operable to generate a feedback output for the shift register, the code generator operable to generate parallel codes, each code generated based on one of the pairs of outputs.

18. The correlation unit as set forth in claim 17, the feedforward block operable to generate the first outputs based on predetermined feedforward bits in the shift register and the feedback block operable to generate the feedback output based on predetermined feedback bits in the shift register.

19. The correlation unit as set forth in claim 18, the shift register operable to generate the second outputs by shifting the feedback output into the shift register and shifting the second outputs out of the shift register.

20. The correlation unit as set forth in claim 19, the feedforward block operable to generate four first outputs with each clock cycle, and the shift register operable to store eighteen bits and to generate four second outputs with each clock cycle.

21. The correlation unit as set forth in claim 20, the bits stored in the shift register represented by x(i+n), with n representing the bit values of 0 to 17 in the shift register, the first outputs represented by z(i), z(i+1), z(i+2) and z(i+3), the feedforward block operable to generate the first outputs based on the following equations:

$$z(i)=x(i+4)+x(i+6)+x(i+15),$$

$$z(i+1)=x(i+5)+x(i+7)+x(i+16),$$

$$z(i+2)=x(i+6)+x(i+8)+x(i+17), \text{ and}$$

$$z(i+3)=x(i+9)+x(i).$$

22. The correlation unit as set forth in claim 18, the feedback block comprising at least one XOR selector operable to generate the feedback output by XORing the predetermined feedback bits.

23. The correlation unit as set forth in claim 18, the feedforward block comprising at least one XOR selector operable to generate the first outputs by XORing the predetermined feedforward bits.

24. The correlation unit as set forth in claim 17, the feedforward block operable to generate four first outputs with each clock cycle, the feedback output comprising four bits, the shift register operable to generate four second outputs with each clock cycle, and the code generator operable to generate four parallel codes.

* * * * *